US010520987B2

(12) United States Patent
Wendt

(10) Patent No.: US 10,520,987 B2
(45) Date of Patent: Dec. 31, 2019

(54) SECURED DEVICE PORTIONS

(71) Applicant: Microsoft Technology Licensing, LLC, Redmond, WA (US)

(72) Inventor: Nicholas Wendt, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/699,973

(22) Filed: Sep. 8, 2017

(65) Prior Publication Data

US 2019/0078729 A1    Mar. 14, 2019

(51) Int. Cl.
*G06F 1/16* (2006.01)
*F16M 13/00* (2006.01)
*E05D 1/00* (2006.01)
*G06F 1/18* (2006.01)

(52) U.S. Cl.
CPC .............. *G06F 1/1681* (2013.01); *E05D 1/00* (2013.01); *F16M 13/005* (2013.01); *G06F 1/1626* (2013.01); *G06F 1/1637* (2013.01); *G06F 1/18* (2013.01); *E05Y 2600/50* (2013.01); *E05Y 2600/52* (2013.01); *E05Y 2900/606* (2013.01)

(58) Field of Classification Search
CPC ............. E05Y 2600/50; E05Y 2600/52; E05Y 2900/606; F16B 19/00; F16B 5/0241; F16B 17/002; F16B 17/008; F16B 19/002; G06F 1/181; G06F 1/183; G06F 1/1681
USPC .......................... 361/679.59; 16/225; 439/161
See application file for complete search history.

(56) References Cited

U.S. PATENT DOCUMENTS

| 6,149,998 | A | 11/2000 | Hettinga | |
|---|---|---|---|---|
| 6,491,278 | B1 | 12/2002 | Thomsen | |
| 8,054,622 | B2 * | 11/2011 | Song ..................... | G06F 1/1616 345/157 |
| 8,438,702 | B2 | 5/2013 | Apgar et al. | |
| 8,821,678 | B1 * | 9/2014 | Yu ......................... | G06F 1/1616 156/308.2 |
| 9,134,808 | B2 | 9/2015 | Siddiqui et al. | |
| 9,189,019 | B2 * | 11/2015 | Jenkins ................ | G06F 1/1616 |
| 9,454,188 | B2 | 9/2016 | Bushnell et al. | |
| 2004/0028503 | A1 * | 2/2004 | Charles .................. | F16B 17/00 411/510 |
| 2007/0283529 | A1 | 12/2007 | Hashizume et al. | |
| 2011/0080030 | A1 * | 4/2011 | Lin ......................... | A47C 7/54 297/411.2 |
| 2013/0083558 | A1 * | 4/2013 | Becze ................... | G06F 3/1438 362/611 |

(Continued)

FOREIGN PATENT DOCUMENTS

WO    WO-2015152906 A1 * 10/2015 ........... G06F 1/1656

OTHER PUBLICATIONS

Kastrenakes, Jacob, "This is How Surface Book's Crazy Hinge Works", Retrieved from «https://www.theverge.com/2015/10/6/9464187/surface-book-hinge-gifs», Oct. 6, 2015, 7 Pages.

*Primary Examiner* — Nidhi Thaker
(74) *Attorney, Agent, or Firm* — Rainier Patents, P.S.

(57) ABSTRACT

The description relates to hinged devices, such as hinged computing devices. One example can include a first portion and a second portion that defines a channel. The example can also include a hinge assembly rotatably coupling the first portion and the second portion, the hinge assembly including a hinge arm that is fitted to the channel and retained in the channel by a state-transitionable material.

20 Claims, 8 Drawing Sheets

(56) References Cited

U.S. PATENT DOCUMENTS

2016/0341234 A1* 11/2016 Germann ............... B21J 15/147
2017/0010631 A1 1/2017 Fan et al.

* cited by examiner

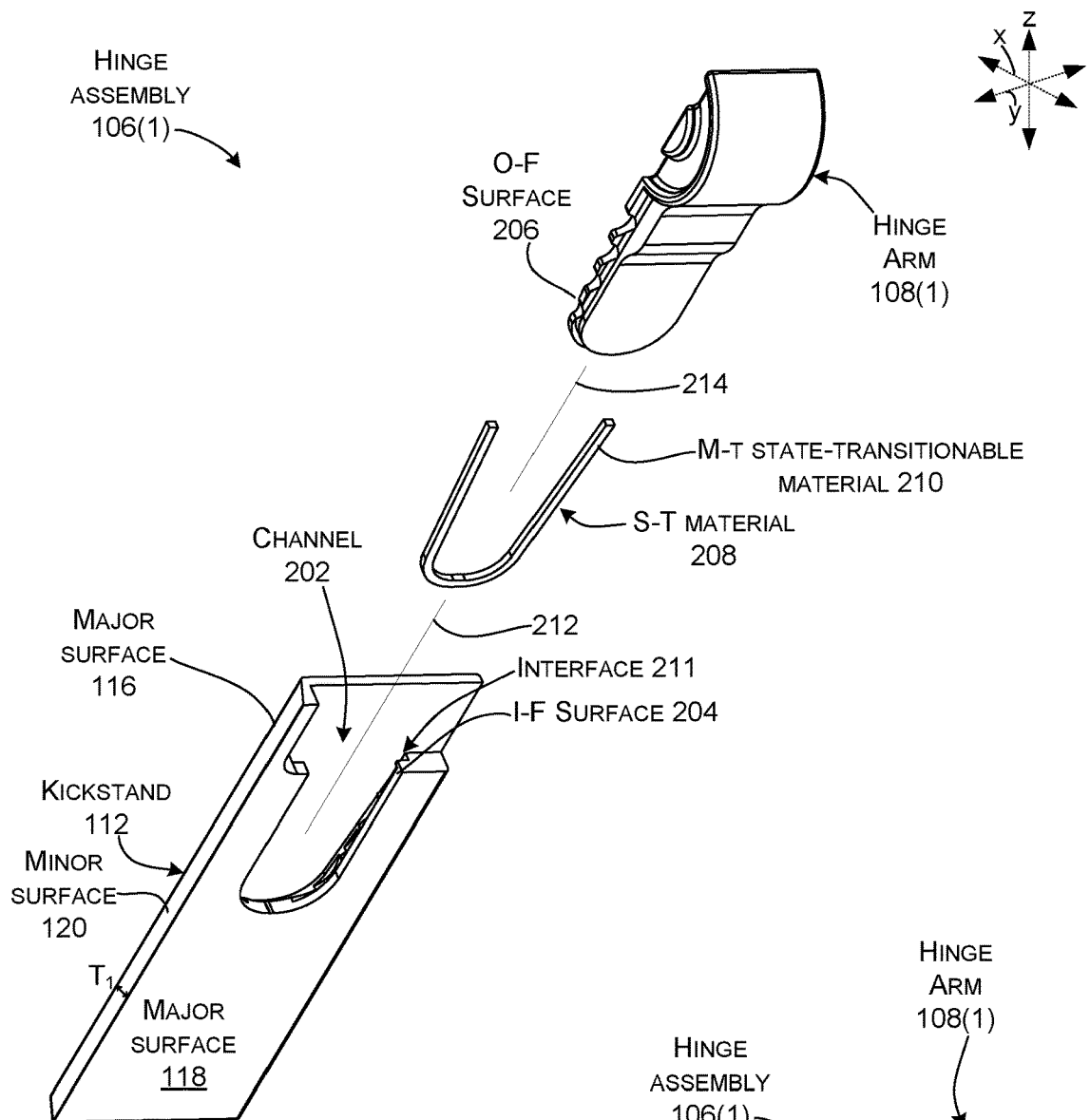
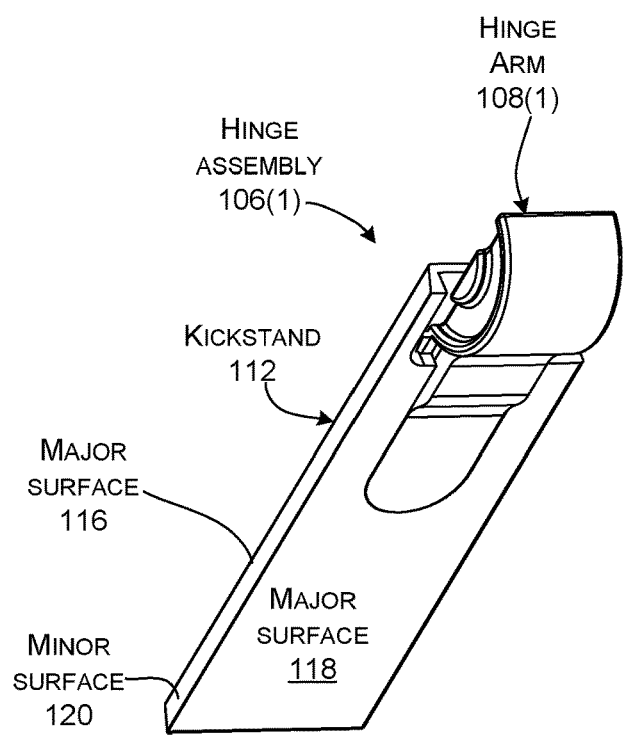
FIG. 2C
FIG. 2D

SECURED DEVICE PORTIONS

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced. Where space permits, elements and their associated reference numbers are both shown on the drawing page for the reader's convenience. Otherwise, only the reference numbers are shown.

FIGS. 1, 2A, 2D, 3B, 4B, 5C, and 6B show perspective views of example devices in accordance with some implementations of the present concepts.

FIGS. 2B, 2C, 3A, 4A, 5A, 5B, and 6A show exploded perspective views of example devices in accordance with some implementations of the present concepts.

DESCRIPTION

The present concepts relate to devices that have portions secured together, such as computing devices employing hinge assemblies that can rotationally secure first and second device portions. The hinge assembly can be secured to the second portion even in space constrained implementations and/or without employing hardware fasteners. These and other features are described below.

Figure 1:
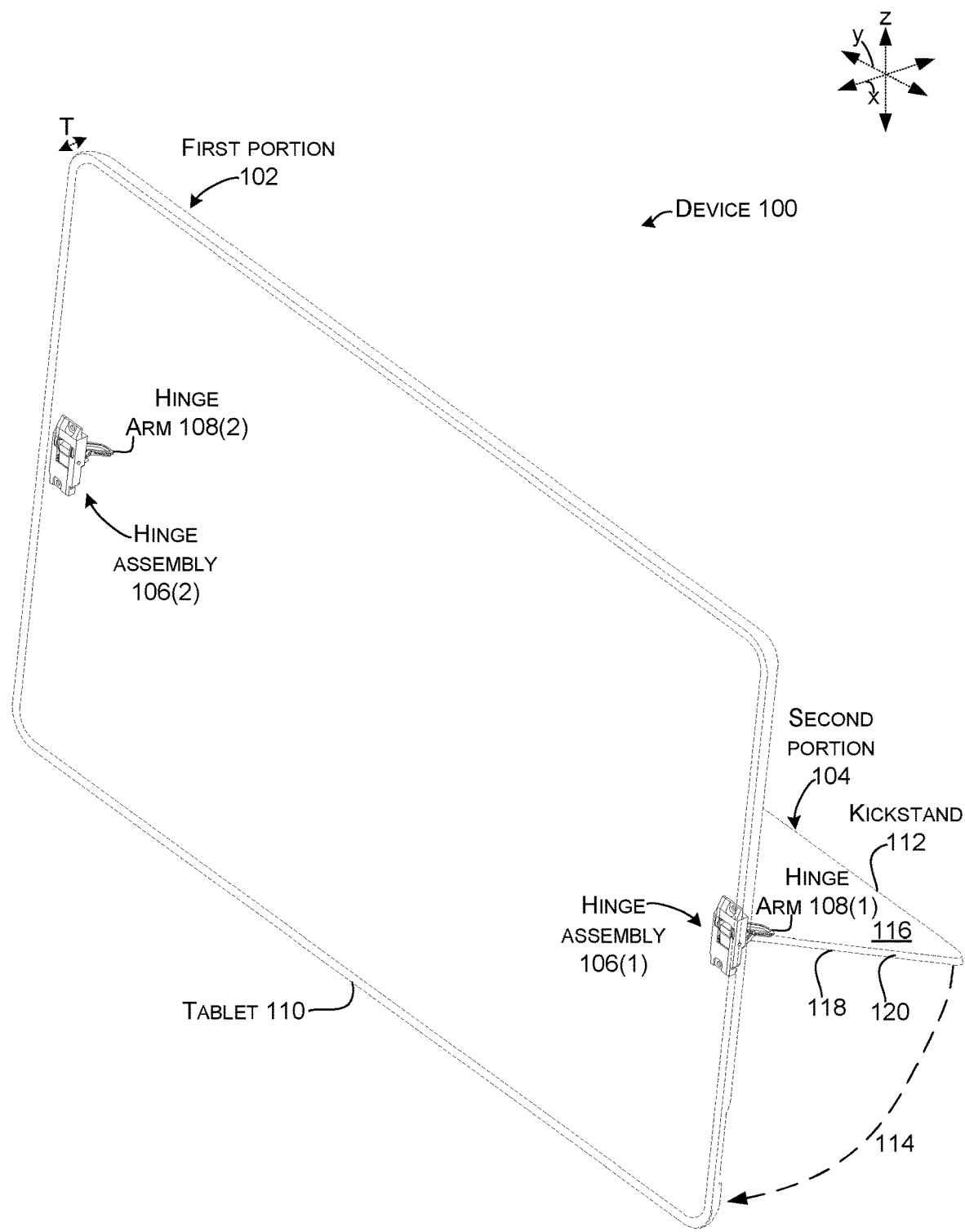

Introductory FIG. 1 shows an example device 100 that has first and second portions 102 and 104 that are rotatably secured together by a hinge assembly 106. In this case, two hinge assemblies 106(1) and 106(2) can operate cooperatively to rotatably secure the first and second portions. Other implementations can use a single hinge assembly or more than two hinge assemblies. In the illustrated configuration, the hinge assemblies 106 are secured within the first portion 102. The hinge assemblies 106 can include hinge arms 108 that can be secured to the second portion 104.

In the illustrated configuration, the first portion 102 is manifest as a tablet 110 (e.g., tablet type computing device) and the second portion 104 is manifest as a kickstand 112 for the tablet 110. The kickstand is illustrated rotated at the hinge assemblies 106 to an open orientation. The hinge assemblies 106 can allow the kickstand to be rotated back to a closed position against the tablet 110 as indicated by arrow 114. The kickstand 112 can define first and second major surfaces 116 and 118 and a minor surface 120 extending therebetween.

Beyond the illustrated tablet configuration, in other implementations, the first and second portions 102 and 104 can be manifest as other form factors. For instance, the first and second portions could be manifest as the input side and display side of a notebook computing device. In another example, the first and second portions could be manifest as two sides of a foldable smart phone or a wearable smart device. In one such example, either or both of the first and second portions can include a display or multiple displays.

Tablet 110 provides an example of a device that is space constrained in at least one direction. In the case of tablets, notebooks, and/or smart phones, the market prefers ever thinner devices as represented by thickness T. An example manner in which the hinge assemblies' hinge arms 108 can be removeably secured to the kickstand 112 in space constrained conditions is illustrated below relative to FIGS. 2A-2D.

Figure 2A:
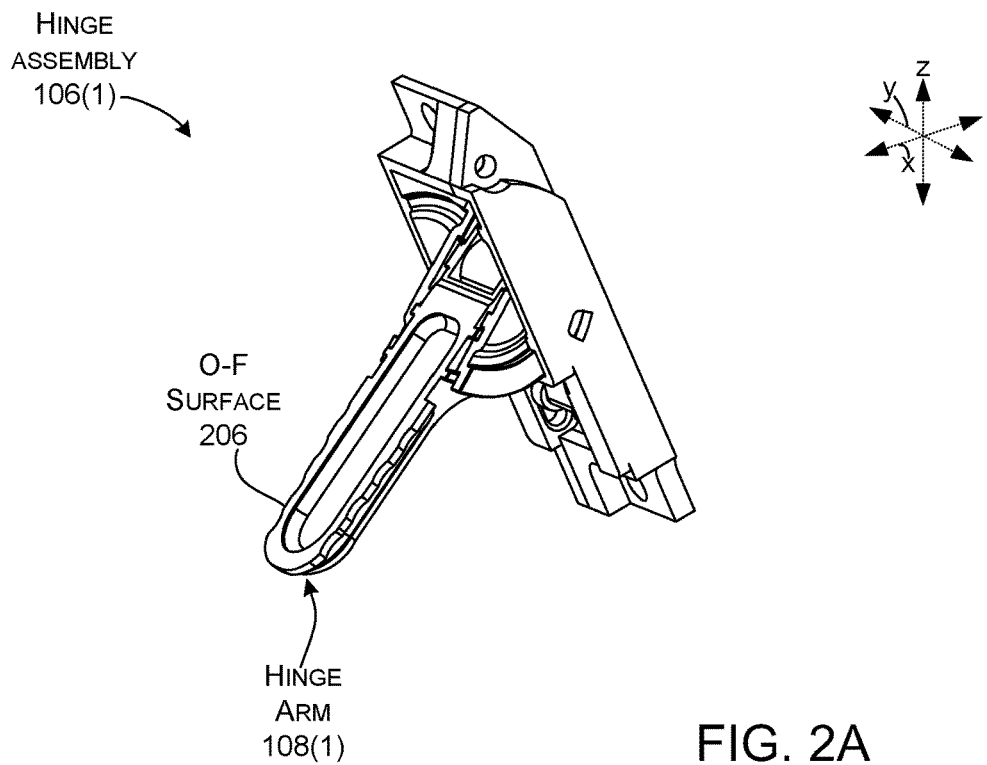
Figure 2B:
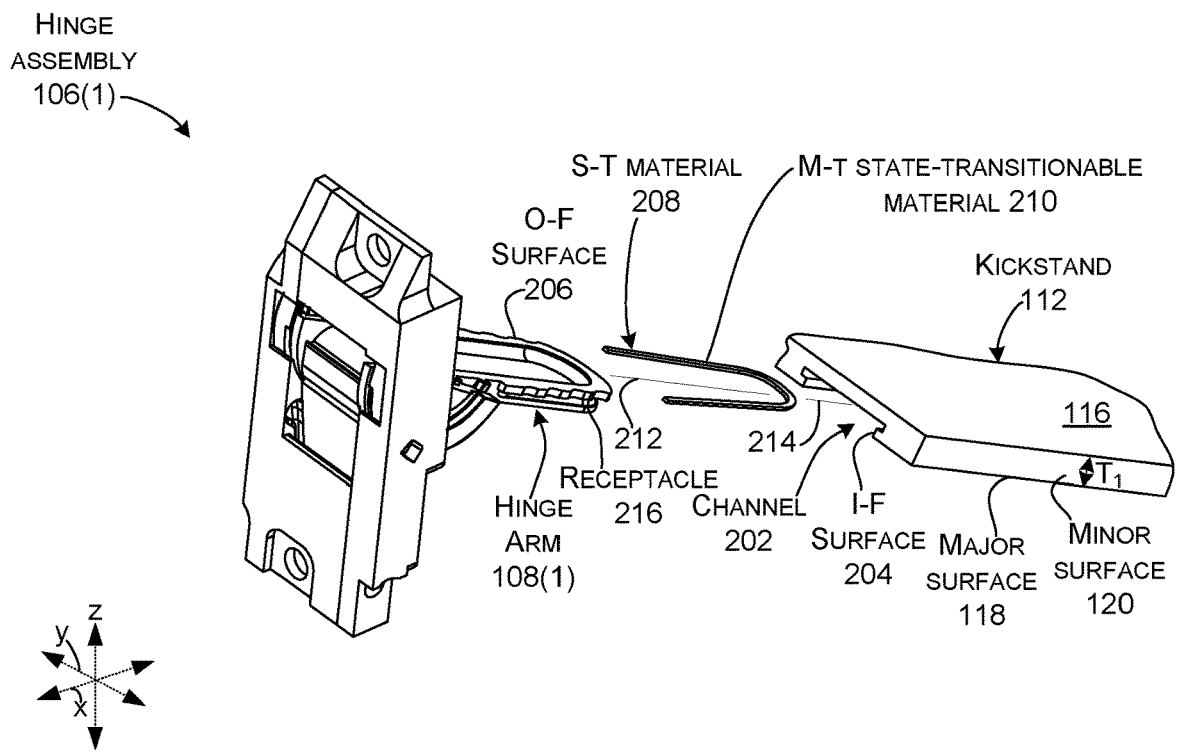

FIGS. 2A-2D collectively show more detailed views of hinge assembly 106(1). FIG. 2A shows the hinge assembly 106(1) in isolation and FIG. 2B shows the inter-relationship of the hinge assembly and the kickstand 112. In FIG. 2, kickstand 112 includes a channel 202 for receiving hinge arm 108(1). The channel 202 can be defined by an inwardly-facing surface 204. The inwardly-facing surface 204 can define a perimeter of the channel. The hinge arm 108(1) can define a corresponding outwardly-facing surface 206. The outwardly-facing surface 206 can define a perimeter of the hinge arm. The hinge arm 108(1) can be retained in the channel by a state-transitionable material 208. For instance, in some implementations, the state-transitionable material 208 can retain the hinge arm 108(1) and/or the kickstand 112 by adhering to one or both of them and/or by mechanically blocking their relative movement. These aspects are described in more detail below.

As mentioned above, the illustrated hinge assembly 106(1) is configured for a spatially constrained device configuration represented by thickness T of FIG. 1. In FIGS. 2B and 2C kickstand 112 is space constrained as it contributes to thickness T to a degree represented as thickness $T_1$ (e.g., thickness of minor surface 120). To satisfy the space constraint, in this implementation the hinge arm 108(1) and the channel 202 are flattened to conform with the constraints of thickness $T_1$. Further, the hinge arm 108(1) and channel 202 can form a nearly seamless union without the need for hardware fasteners to secure the components.

Various types of state-transitionable materials 208 can be employed. One type of state-transitionable material 208 that can be employed is temperature sensitive adhesive. In the case of temperature sensitive adhesive, the adhesive can be heated from an ambient temperature to a first temperature where the adhesive assumes a relatively pliant state. With some temperature sensitive adhesives, reaching a second temperature that is higher than the first temperature causes the adhesive to transform from the relatively pliant state to the relatively rigid state. For instance, in some implementations, the temperature sensitive adhesive can be manifest as thermal set adhesive or heat activated films using temperature to initiate crosslinking of the adhesive material. This forms a bond with the substrates (e.g., kickstand 112 and the hinge arm 108). Examples include: Tesa 584XX and 84XX series adhesives, among others. From another perspective, temperature sensitive adhesives can be selected that are relatively rigid at the ambient operating temperatures the device is designed to operate at and that transition to a pliable state at a temperature that is below a temperature that will degrade the device.

Thermoplastic materials are another type of state-transitionable material 208. For instance, at a first relatively higher temperature, thermoplastics tend to have a first, pliant state. In the pliant state, the thermoplastic tends to behave like a very viscous fluid. At a relatively lower temperature, thermoplastics tend to have a second, more rigid state that behaves like a solid rather than a fluid. The state change can be repeated. For instance, during assembly the thermoplastic can be heated to the pliant state and then cooled to the rigid state to secure the elements. In particular circumstances, such as repair scenarios, the thermoplastic can again be heated to the pliant state to allow disassembly of the elements and subsequent reassembly followed by cooling to the rigid state.

Other state-transitionable materials don't readily provide multiple state changes. For instance, most glues, such as epoxies, can be applied in a pliant state and transitioned to a rigid state but are then not readily transitioned back to a pliant state. Thus, for some applications, the present implementations can distinguish between state-transitionable materials that can be transitioned a single time (e.g., pliant to rigid)(referred to hereinafter as "single-transition" or "s-t") from those which can be transitioned multiple times (e.g., pliant to rigid and back to pliant) (referred to hereinafter as "multiple-transition" or "m-t").

To removably secure kickstand 112 and hinge arm 108(1), the kickstand 112, state-transitionable material 208 in the form of a m-t state-transitionable material 210, and hinge arm 108(2) can be arranged as shown in FIG. 2C. For example, the m-t state-transitionable material 210 can be manifest as a thermoplastic material. In this case, the m-t state-transitionable material 210 can be in a relatively stiff or rigid state and can be shaped to approximate a perimeter of the hinge arm 108(1). The m-t state-transitionable material 210 and the hinge arm 108(1) can be directed into the channel 202 as indicated by lines 212 and 214. In some cases, the hinge arm 108(1) and/or the channel 202 can include a receptacle 216 (FIG. 2B) that is configured to receive and hold the m-t state-transitionable material 210 in the proper location and orientation during assembly.

In the rigid state, the m-t state-transitionable material 210 may prevent complete assembly. At this point, the m-t state-transitionable material 210 can be heated to transition it to a more pliant state. This can be accomplished with various techniques. For instance, hot air may be directed at the m-t state-transitionable material 210. Alternatively, hot thermal conductors may be positioned against the kickstand 112 and/or the hinge arm 108(1) to heat the state-transitionable material 208 until it reaches the more pliant state. (Still another example is described relative to FIGS. 4A and 4B). The kickstand 112 and the hinge arm 108(1) can then be forced together until fully assembled. The force can cause the pliant m-t state-transitionable material 210 to flow or disperse in an interface 211 between the hinge arm 108(1) and the kickstand 112. This position can be maintained until the m-t state-transitionable material 210 cools to its more rigid state. In the rigid state, the m-t state-transitionable material 210 can secure the kickstand and the hinge arm together while being totally hidden and/or without any hardware fasteners extending between the kickstand and the hinge arm. Further, in the event that the device requires repair, the m-t state-transitionable material 210 can once again be heated to the pliant state to allow the kickstand and the hinge arm to be readily separated without damage. The process can then be repeated to re-assemble the kickstand and the hinge arm.

Figure 3A:
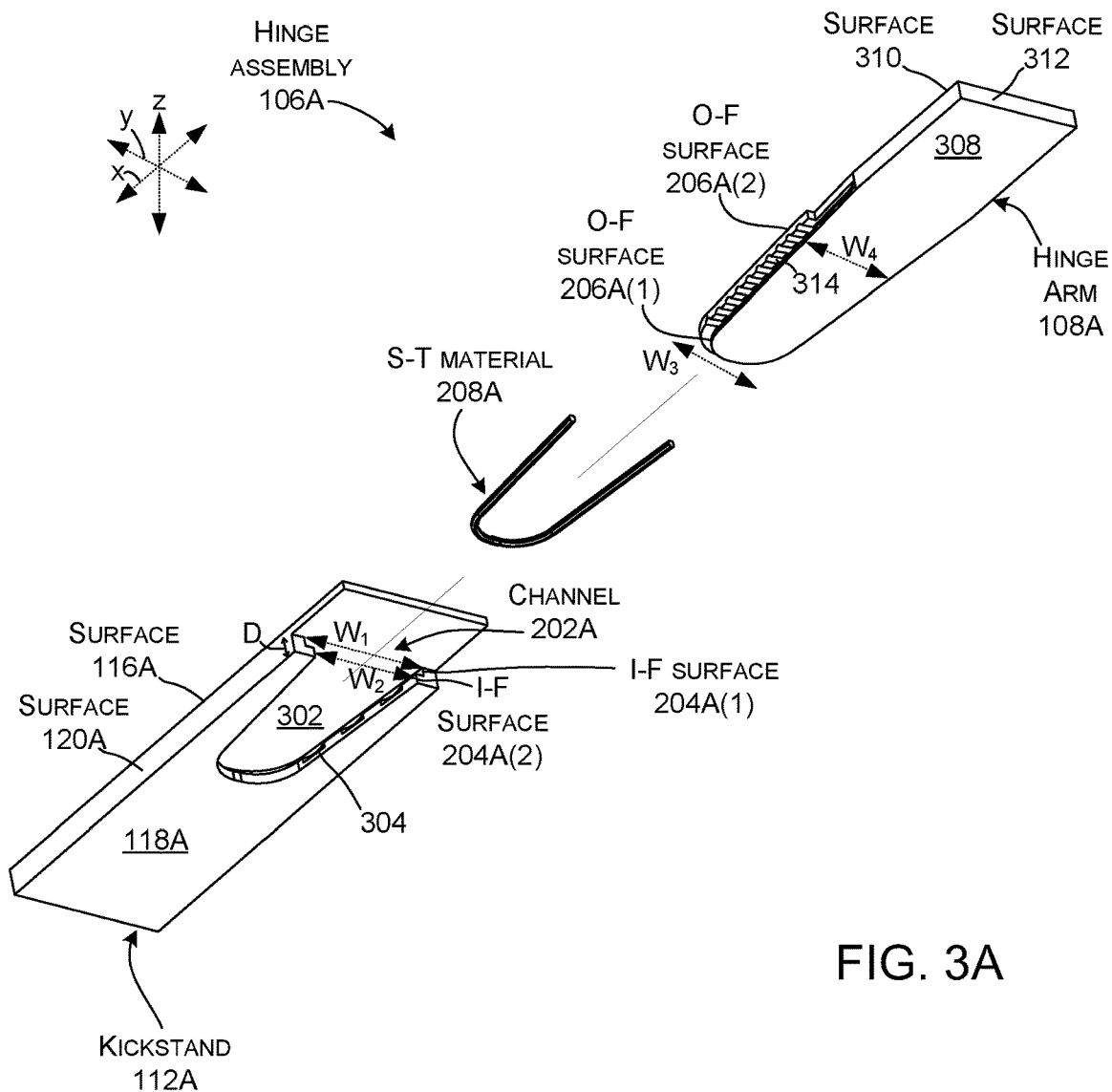
Figure 3B:
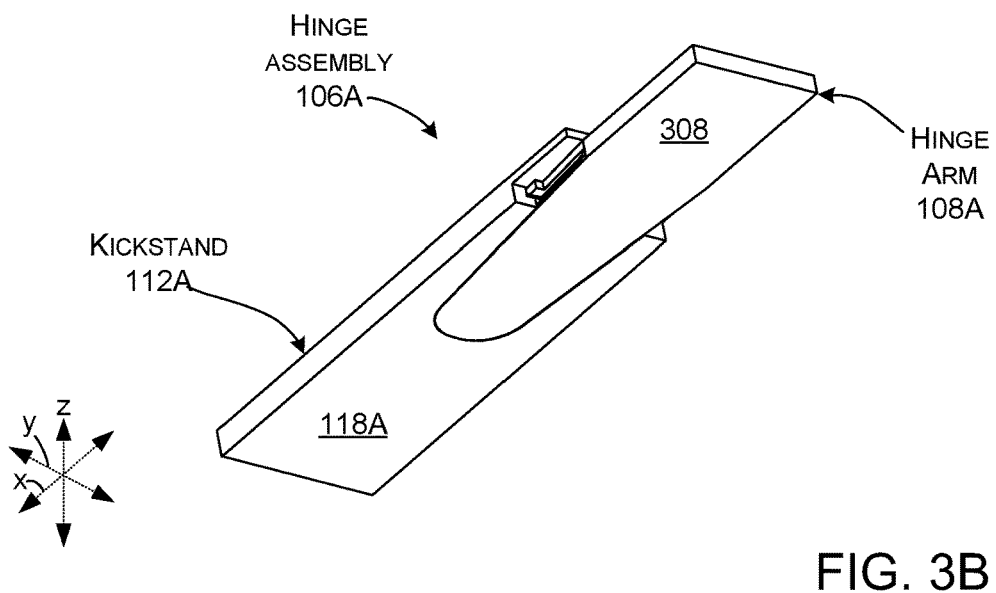

FIGS. 3A and 3B collectively show another hinge arm 108A and kickstand 112A. FIG. 3B shows the hinge arm 108A and the kickstand 112A assembled, and FIG. 3A shows the hinge arm and kickstand separately and aligned for assembly. In this case, the channel 202A is formed into minor surface 120A at major surface 118A of the kickstand 112A and does not extend all the way through to major surface 116A (facing away from reader). In other implementations, the channel 202A could be formed within the kickstand 112A between but not including major surfaces 116A and/or 118A.

In this case, the channel 202A has a uniform depth D to a planar inner surface 302. The channel is also defined by multiple (in this case two) inwardly-facing surfaces 204A(1) and 204A(2) of the channel 202A that collectively extend between major surface 118A of the kickstand 112A and the planar inner surface 302. In this implementation, the channel has a width Wi at inwardly-facing surfaces 204A(1) (e.g., at surface 302) that is greater than a width $W_2$ of the channel measured at major surface 118A.

In some cases, the first inwardly-facing surfaces 204A(1) can include a pattern, while the second inwardly-facing surface 204A(2) is generally smooth (at major surface 118A). In the illustrated example, both inwardly-facing surfaces are generally smooth and a patterned surface 304 extends between first inwardly-facing surface 204A(1) and the second inwardly-facing surface 204A(2). From one perspective, a patterned surface can be any surface that offers more interface to the state-transitionable material 208 than would be offered by a smooth planar surface. Several examples are illustrated. Example patterned surfaces can include serrated patterns, among other regular and irregular patterns.

The hinge arm 108A defines first and second major surfaces 308 and 310 that extend between minor surface 312. A thickness of the hinge arm (e.g., minor surface 312) can correspond to depth D of channel 202A. The hinge arm 108A can include two outwardly-facing surfaces 206A(1) and 206A(2) between the first and second major surfaces 308 and 310. In this implementation, the hinge arm 108A has a width $W_3$ at outwardly-facing surface 206A(2) (e.g., at major surface 310) that is greater than a width $W_4$ of the hinge arm measured at outwardly-facing surfaces 206A(1) (e.g., at major surface 308). (Note that surface 310 is obscured in FIG. 3A so width $W_3$ is difficult to label accurately on the drawing page.) From one perspective, the widths of the channel 202A and the hinge arm 108A can create a 'tongue and groove' that helps retain the hinge arm in the channel. For instance, the hinge arm can slide into the channel in the x-reference direction, but is constrained in other directions, such as the y and z-reference directions.

Stated another way, the outwardly-facing surfaces 206A(1) and 206A(2) can have the same perimeter or they can have different perimeters. In the illustrated configuration, the perimeter proximate to major surface 308 is smaller than the perimeter that is distal to major surface 308 and is proximate to major surface 310. This configuration can aid in retaining the hinge arm 108A in the kickstand 112A during use of the device.

In some configurations, the first outwardly-facing surface 206A(1) can include a pattern, such as a serrated pattern that is complementary to the pattern of the channel 202A. In the illustrated configuration, a patterned surface 314 extends between outwardly-facing surfaces 206A(1) and 206A(2). When assembled, patterned surface 314 can complement patterned surface 304 of the channel 202A. Alone and/or in combination with the tongue and groove pattern, the complementary patterned surfaces can enhance the ability of the state-transitionable material 208A to reliably secure the hinge arm 108A and the kickstand 112A in the space constraints of the kickstand without hardware fasteners that could detract from the appearance of the device. This aspect is described in more detail below relative to FIGS. 6A-6E.

Stated another way, the hinge arm 108A's outwardly-facing surface 206A(1) can be smooth and can correspond to the channel's smooth inwardly-facing surface 204A(2). When assembled, the smooth inwardly-facing surface 204A(2) and smooth outwardly-facing surface 204A(1) can be mated together to create an unobtrusive seam along the first surface 302 of the kickstand. In such a case, an entirety of the hinge arm's major surface 308 can lie within the plane of the kickstand's major surface 118A.

Figure 4A:
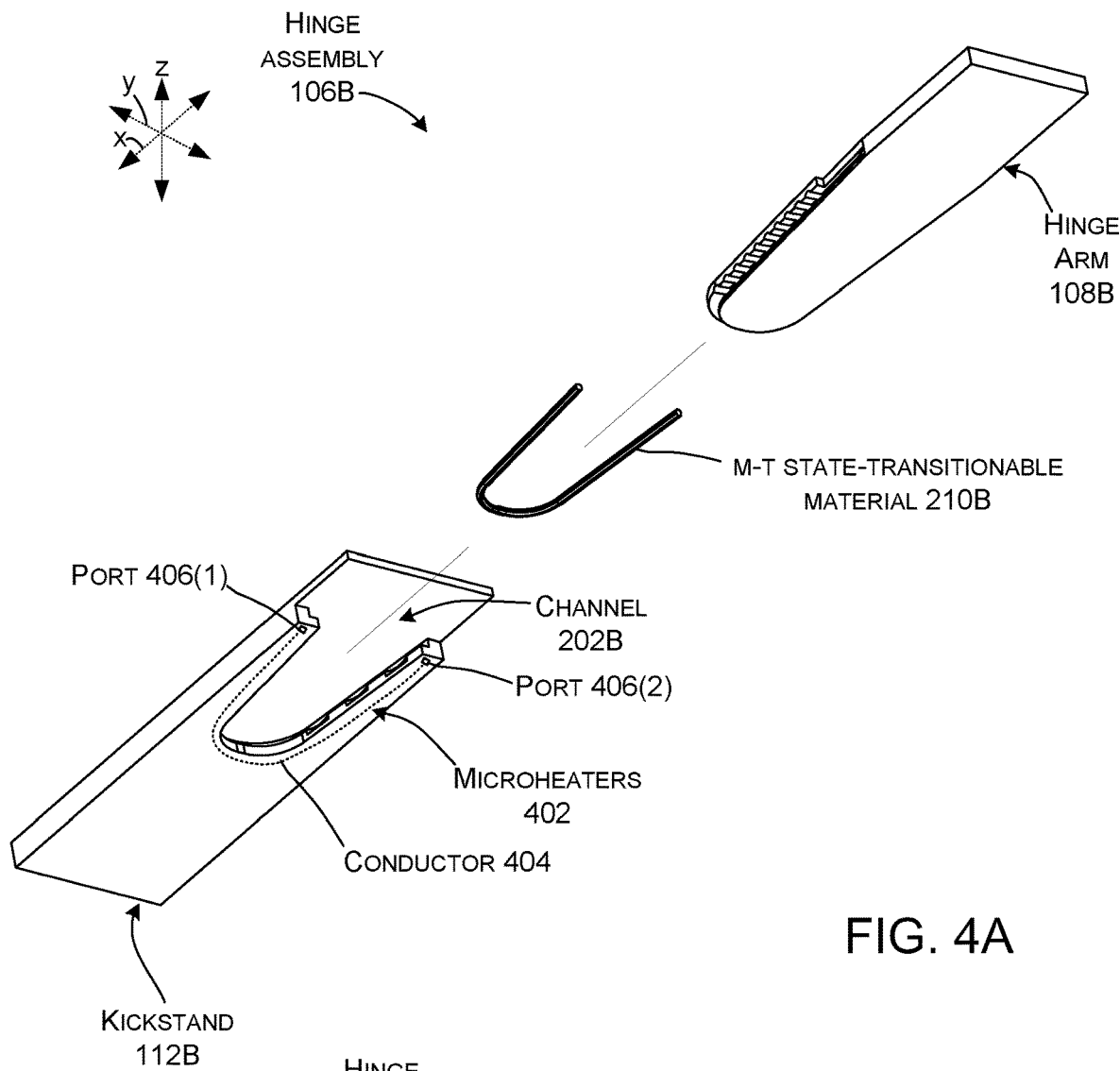
Figure 4B:
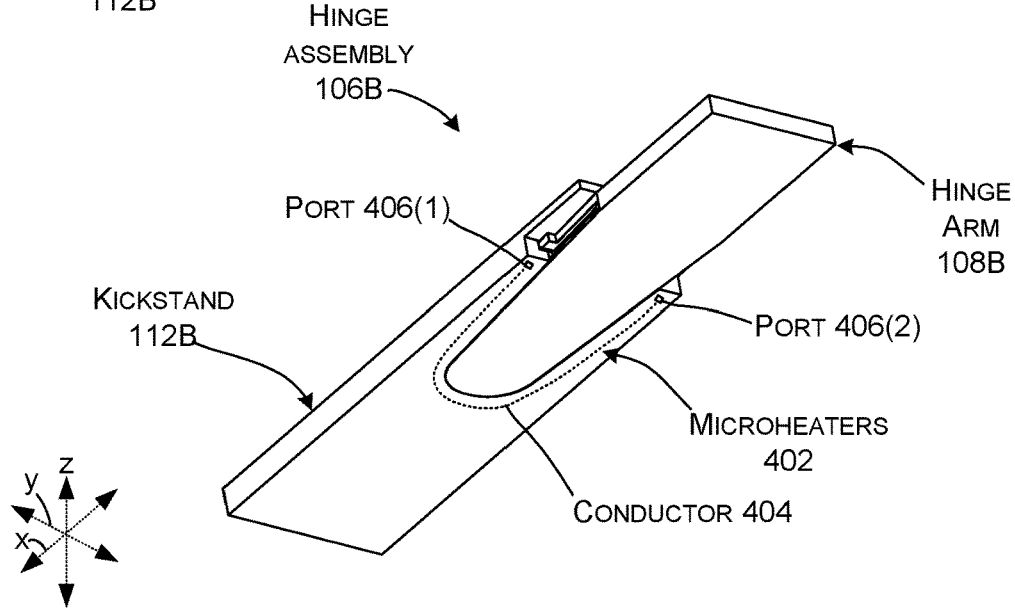

FIGS. 4A and 4B collectively show an example hinge assembly 106B that is similar to hinge assembly 106A of FIGS. 3A and 3B. In this case, the hinge assembly 106B includes microheaters 402 proximate to the channel 202B. In this example, the microheaters 402 include a conductor 404 and electrical ports 406(1) and 406(2). The conductor 404 is embedded in kickstand 112B and as such is shown in "ghost". To assemble the hinge arm 108B on the kickstand 112B, power can be supplied to the electrical ports 406 to heat the kickstand proximate to the channel. The m-t state-transitionable material 210B and the hinge arm 108B can be partially assembled with the kickstand. Once heat from the conductor heats the m-t state-transitionable material 210B to a relatively pliant state, assembly can be completed and the power removed from the electrical ports. The process is complete once the m-t state-transitionable material 210B cools to a more rigid state. In an instance where disassembly is desired, such as in a repair situation, power can once again be supplied to the electrical ports to soften the m-t state-transitionable material 210B to allow disassembly without damage.

Figure 5A:
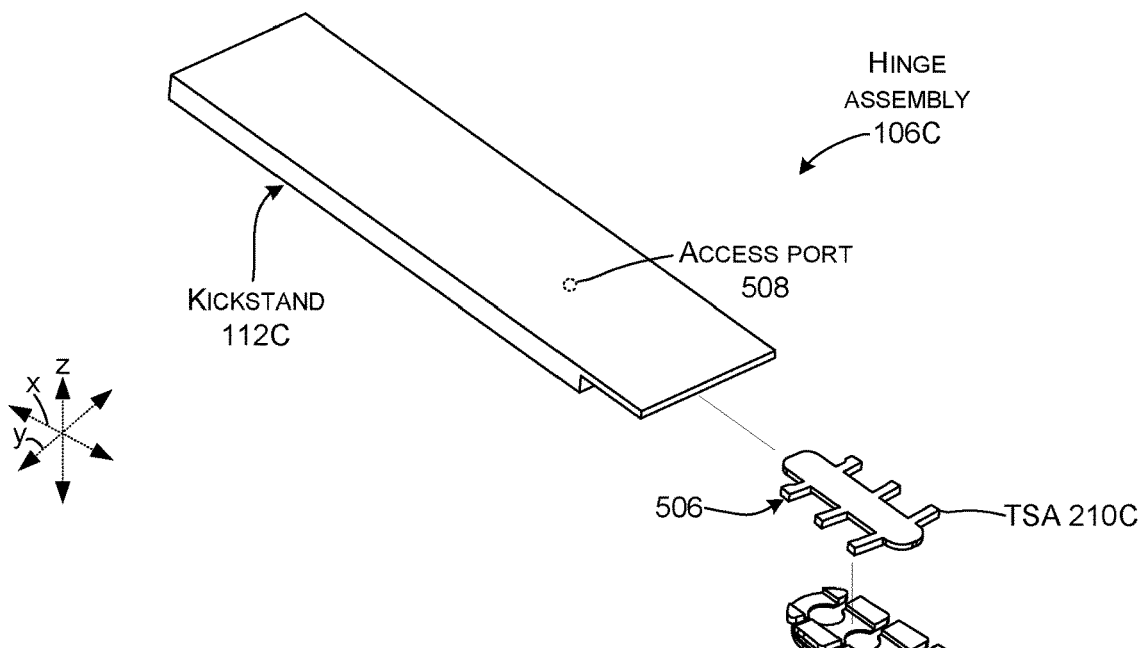
Figure 5B:
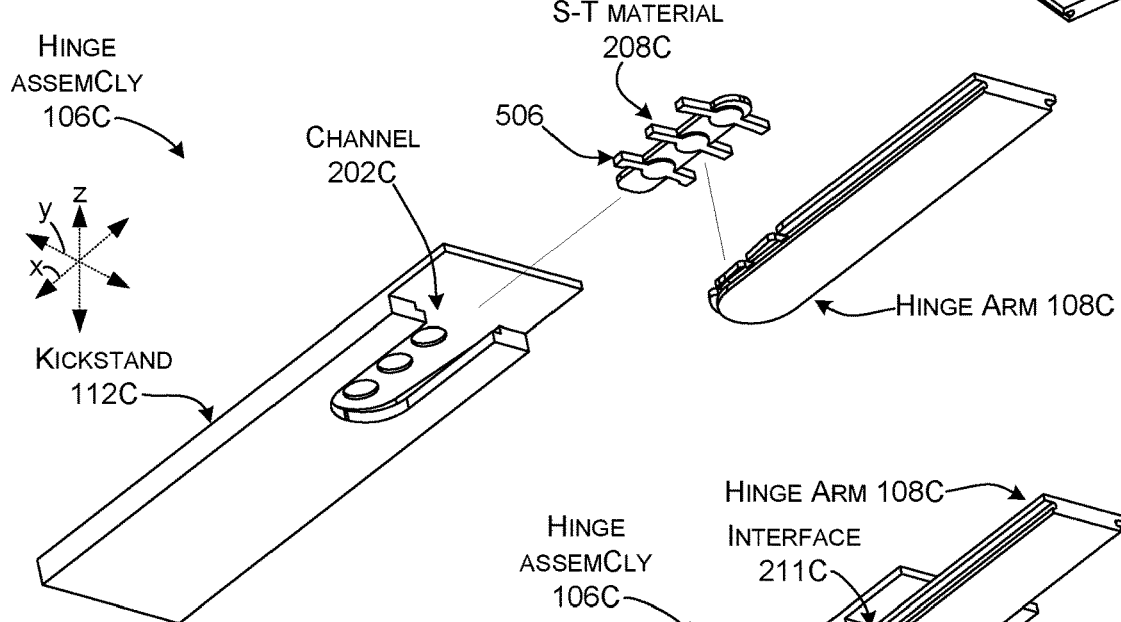
Figure 5C:
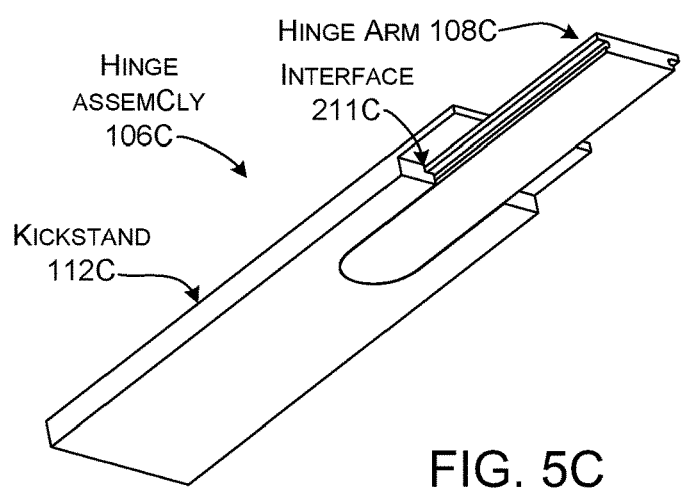

FIGS. 5A-5C show another implementation where the hinge arm 108C defines a plenum 502. The plenum can be configured to distribute state-transionable material 208C to an interface 211C of the channel 202C and the hinge arm 108C. For instance, the state-transionable material 208C can be heated to a relatively flowable state. At least some of the state-transionable material can flow to the interface 211C. The state-transionable material 208C can then be allowed to cool to a more rigid state to secure the interface 211C.

Two implementations utilizing the plenum 502 are illustrated. In the first implementation, state-transionable material 208C is formed into a shape 506 corresponding to the plenum. The shaped state-transionable material 208C can be inserted into the plenum 502 in a relatively rigid state (e.g., at room temperature). The hinge arm 108C can be inserted into the kickstand 112C. The state-transionable material 208C can be heated until it flows within the plenum 502 to the interface 211C. The temperature can then be lowered until the state-transionable material 208C returns to the relatively rigid state.

In an alternative configuration, the kickstand 112C can include an access port 508. The access port can be connected to the hinge arm's plenum 502. The hinge arm 108C and the kickstand 112C can be assembled and heated. State-transionable material 208C that is in a relatively flowable state can be injected into the access port 508 and allowed to flow through the plenum 502 to the interface 211C. The hinge assembly 106C can then be cooled for use.

Figure 6A:
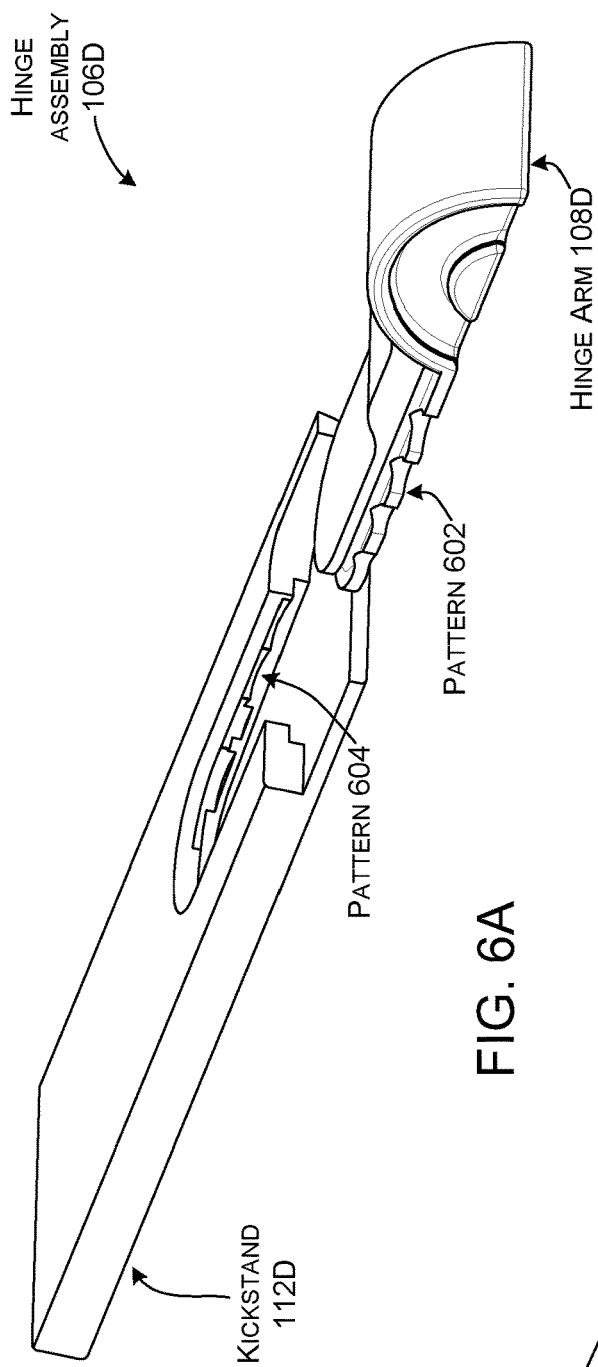
Figure 6B:
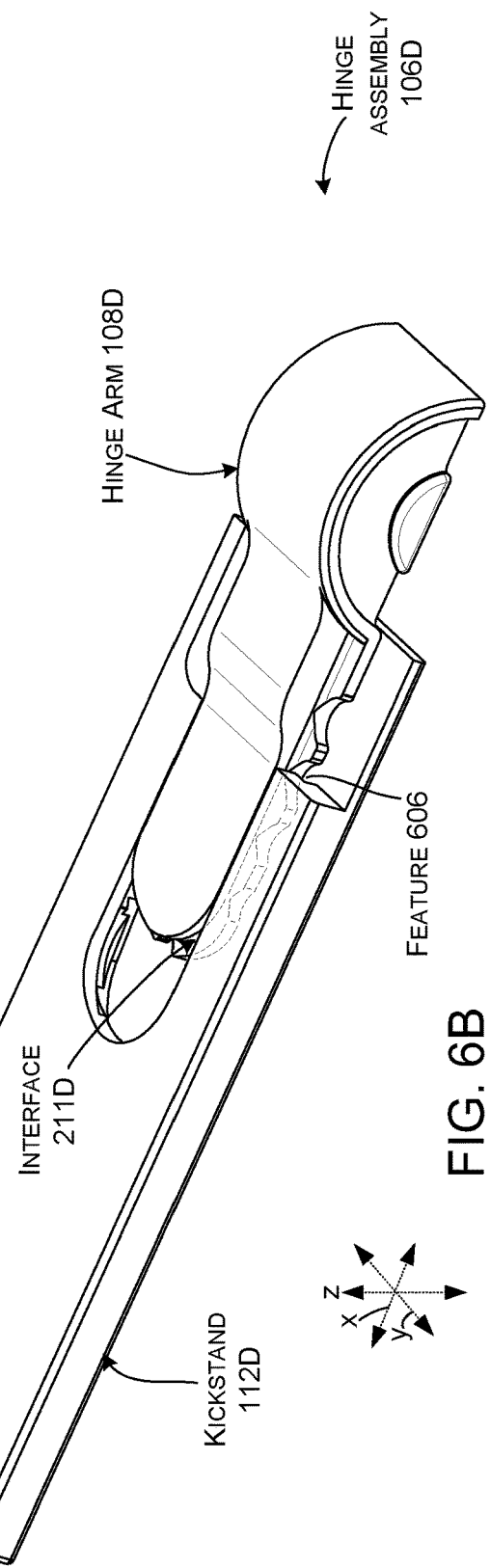
Figures 6C, 6D, 6E:
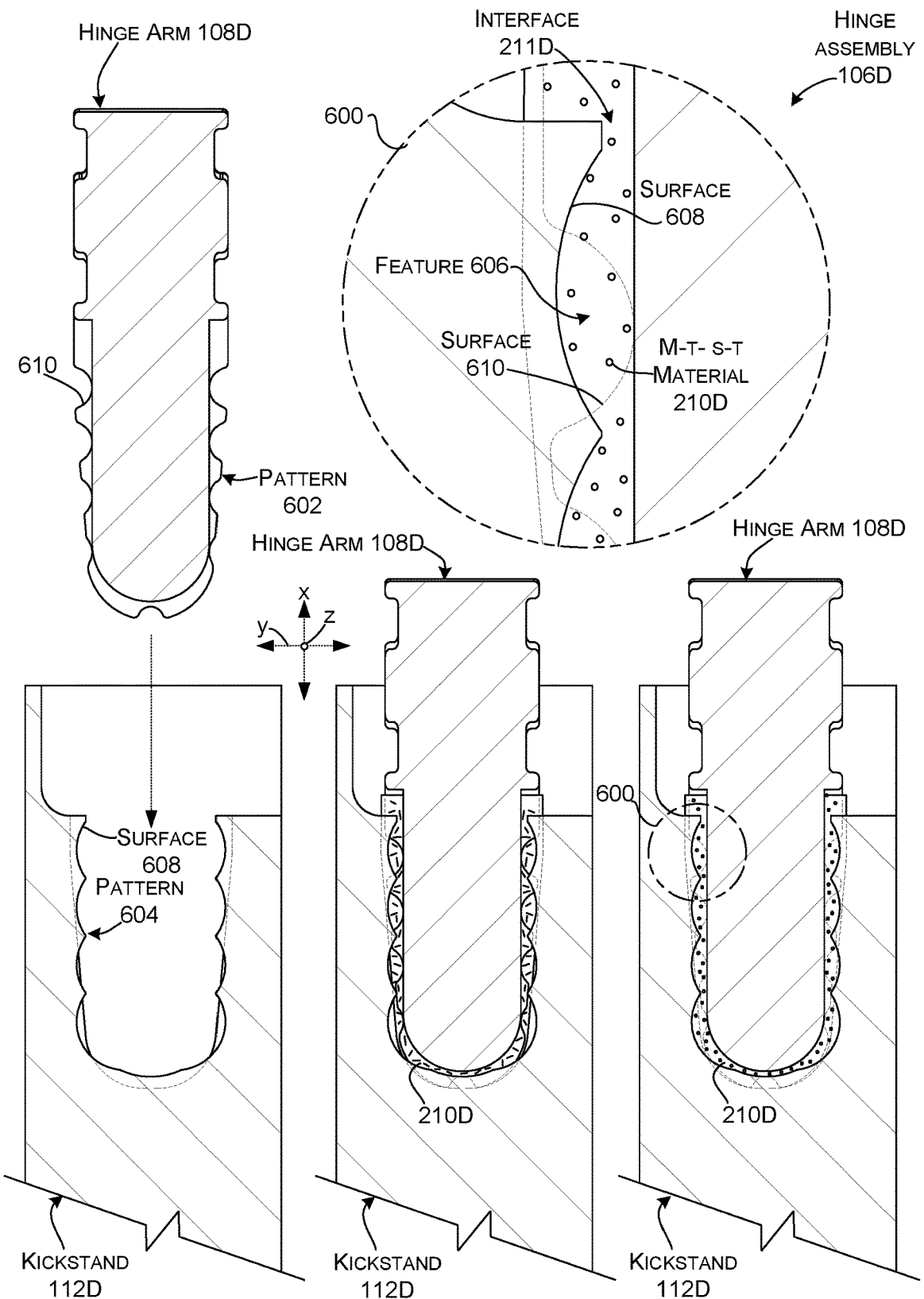
FIGS. 6C-6E show sectioned views of example devices in accordance with some implementations of the present concepts.

FIGS. 6A-6E collectively show another example hinge assembly 106D. FIGS. 6A and 6B are unassembled and partially assembled perspective views, respectively. FIGS. 6C, 6D, and 6E are cutaway elevational views, with FIG. 6C being unassembled and FIGS. 6D and 6E being assembled. A portion of FIG. 6E is shown enlarged at 600 to offer greater resolution of some of the aspects of this implementation.

In this case, the hinge arm 108D defines a pattern 602 (in this case an outwardly facing pattern) and the kickstand 112D defines a corresponding pattern 604 (in this case a downwardly facing pattern). When assembled via movement in the x-reference direction, the hinge arm 108D and the kickstand 112D define an interface 211D. Disassembly can be accomplished with movement in the opposite x-reference direction. The patterns 602 and 604 can collectively define features or voids 606 in the interface 211D. The features can be defined by surfaces 608 of kickstand 112D and surfaces 610 of hinge arm 108D that are not parallel to the direction of assembly/disassembly (in this case the x-reference direction). (To avoid clutter on the drawing page, not all of features 606 and surfaces 608 and 610 are labeled with specificity). For instance, these surfaces 608 and 610 can be linear surfaces that define oblique and/or perpendicular angles to the x reference direction and/or the surfaces 608 and 610 can be curvilinear such that at least a portion of the surfaces are not parallel to the x-refence direction.

FIG. 6D shows m-t state-transitionable material 210D supplied to interface 211D in a relatively pliant state (represented by linear stippling) such that the m-t state-transitionable material fills features 606.

FIG. 6E shows the m-t state-transitionable material 210D transitioned to a relatively rigid state (represented by circular stippling). Note that with the rigid material occupying features 606, the rigid material physically blocks relative movement between the hinge arm 108D and the kickstand 112D, especially in the x reference direction. For instance, the presence of rigid m-t state-transitionable material 210D in feature 606 between surface 610 of the hinge arm 108D and surface 608 of the kickstand 112D physically blocks withdrawal of the hinge arm from the kickstand (e.g., blocks x direction relative movement between the hinge arm and the kickstand). Subsequently if disassembly is desired, the m-t state-transitionable material 210D could be returned to the pliant state. In the pliant state, force on the hinge arm 108D in the opposite x-reference direction can cause the m-t state-transitionable material 210D to move or flow in the interface 211D and allow surface 608 to pass through feature 606. Thus, this implementation does not rely on adhesion of the m-t state-transitionable material 210D to the hinge arm 108D and/or the kickstand 112D to physically secure these elements relative to one another.

Individual elements of the hinge assemblies 106 can be made from various materials, such as metals, plastics, foams, polymers, and/or composites. These materials can be prepared in various ways, such as in the form of sheet metals, die cast metals, machined metals, 3D printed materials, molded or 3D printed plastics, and/or molded or 3D printed composites, among others, or any combination of these (and/or other) materials and/or preparations can be employed.

The present hinge assembly concepts can be utilized with any type of device, such as but not limited to notebook computers, smart phones, wearable smart devices, tablets, and/or other types of existing, developing, and/or yet to be developed devices.

Various methods of manufacture, assembly, and/or use for hinge assemblies and devices are contemplated beyond those shown above relative to FIGS. 1-6E.

Although techniques, methods, devices, systems, etc., pertaining to hinge assemblies are described in language specific to structural features and/or methodological acts, it is to be understood that the subject matter defined in the appended claims is not limited to the specific features or acts described. Rather, the specific features and acts are disclosed as example forms of implementing the claimed methods, devices, systems, etc.

Various device examples are described above. Additional examples are described below. One example includes a device comprising a first portion, a second portion that defines a channel, and further includes a hinge assembly rotatably coupling the first portion and the second portion. The hinge assembly includes a hinge arm that is fitted to the channel and retained in the channel by a state-transitionable material without mechanical fasteners.

Another example can include any of the above and/or below examples where the first portion comprises a tablet and the second portion comprises a kickstand.

Another example can include any of the above and/or below examples where the first portion includes a display and the second portion includes another display.

Another example can include any of the above and/or below examples where the channel is formed at a surface of the second portion.

Another example can include any of the above and/or below examples where the channel is formed within the second portion.

Another example can include any of the above and/or below examples where the channel extends from a surface of the second portion into the second portion for a uniform depth to a planar inner surface of the second portion.

Another example can include any of the above and/or below examples where an inwardly-facing surface of the channel extending between the surface of the second portion and the planar inner surface includes a serrated pattern.

Another example can include any of the above and/or below examples where the hinge arm defines an outwardly-facing surface that includes a complementary serrated pattern.

Another example can include any of the above and/or below examples where the hinge arm defines a thickness between first and second major surfaces.

Another example can include any of the above and/or below examples where the first and second major surfaces have identical perimeters.

Another example can include any of the above and/or below examples where the first and second major surfaces have different perimeters.

Another example can include any of the above and/or below examples where the hinge arm defines a receptacle that retains the state-transitionable material before assembly into the channel.

Another example can include any of the above and/or below examples where the device further comprises a conductor that can be energized to heat the state-transitionable material.

Another example can include any of the above and/or below examples where a path of the conductor generally follows a perimeter of the channel.

Another example can include any of the above and/or below examples where the device further comprises a plenum in the second portion through which the state-transitionable material is introduced to an interface between the second portion and the hinge arm.

Another example can include a device comprising a tablet and a kickstand rotatably secured by a hinge assembly. The kickstand defines a flattened channel defined by an inwardly facing surface. The hinge assembly comprises a flattened hinge arm defining a corresponding outwardly facing surface. The inwardly facing surface and the outwardly facing surface collectively define a feature. A state-transitionable material is positioned in the feature and physically blocks relative movement of the inwardly facing surface and the outwardly facing surface.

Another example can include any of the above and/or below examples where the blocking removably secures the flattened hinge arm to the kickstand without fasteners between the flattened hinge arm and the kickstand.

Another example can include any of the above and/or below examples where an entirety of a major surface of the flattened hinge arm lies in a plane defined by a major surface of the kickstand.

Another example can include a device comprising a first portion secured to a hinge assembly that includes a hinge arm and further comprises a second portion which defines a minor surface extending between opposing first and second major surfaces and having a channel formed through the minor surface. The channel has a width at the first major surface that is greater than a width of the channel measured at a point between the first major surface and the second major surface. The hinge arm is retained in the channel by a rigid state-transitionable material positioned in a feature collectively defining the hinge arm and the second portion at the point, and the rigid state-transitionable material physically blocks movement of the hinge arm in the channel.

Another example can include any of the above and/or below examples where the rigid state-transitionable material is a thermoplastic material.

The invention claimed is:

1. A device, comprising:
    a tablet and a kickstand rotatably secured by a hinge assembly;
    the kickstand defining a flattened channel defined by an inwardly facing surface;
    the hinge assembly comprising a flattened hinge arm positioned in the flattened channel and defining a corresponding outwardly facing surface, the inwardly facing surface and the outwardly facing surface collectively defining a feature that includes a void; and,
    a state-transitionable material positioned in the void of the feature, wherein a shape of the state-transitionable material within the void mechanically blocks relative movement of the inwardly facing surface and the outwardly facing surface without a mechanical fastener between the flattened hinge arm and the kickstand and regardless of whether the state-transitionable material bonds to either the inwardly facing surface or the outwardly facing surface.

2. The device of claim 1, wherein the inwardly facing surface defines a serrated pattern and the outwardly facing surface defines another serrated pattern.

3. The device of claim 1, wherein the state-transitionable material mechanically blocks movement of the flattened hinge arm out of the channel without relying on adhesion.

4. The device of claim 1, wherein the flattened hinge arm further defines a patterned surface that contributes to defining the feature and wherein the patterned surface is perpendicular to the outwardly facing surface.

5. A device, comprising:
    a first portion secured to a hinge assembly, the hinge assembly including a hinge arm; and,
    a second portion defining a minor surface extending between opposing first and second major surfaces and having a channel formed through the minor surface, the channel having a width at the first major surface that is greater than another width of the channel measured at a point between the first major surface and the second major surface, the hinge arm is retained in the channel without mechanical fasteners by a rigid state-transitionable material positioned in a void of a feature collectively defined by the hinge arm and the second portion at the point, and a shape of the rigid state-transitionable material within the void mechanically blocking movement of the hinge arm in the channel.

6. The device of claim 5, wherein the rigid state-transitionable material is a thermoplastic material.

7. A device, comprising: a first portion; a second portion having upper and lower surfaces and defining a thickness between the upper and lower surfaces, the second portion defining a channel that is between the upper and lower surfaces; and, a hinge assembly rotatably coupling the first portion and the second portion, the hinge assembly including a flattened hinge arm having a height that is less than the thickness of the second portion, the flattened hinge arm fitted within the channel so that a surface of the flattened hinge arm is flush with the second surface and retained within the channel by a state-transitionable material positioned within a void between the flattened hinge arm and the second portion in the channel, the flattened hinge arm retained within the channel without mechanical fasteners.

8. The device of claim 7, wherein the first portion comprises a tablet and the second portion comprises a kickstand.

9. The device of claim 7, wherein the first portion includes a display and the second portion includes another display.

10. The device of claim 7, wherein the channel is formed at the upper surface of the second portion.

11. The device of claim 7, wherein the channel is formed within the second portion.

12. The device of claim 7, wherein the channel extends from the upper surface of the second portion into the second portion for a uniform depth to a planar inner surface of the second portion.

13. The device of claim 12, wherein an inwardly-facing surface of the channel extending between the upper surface of the second portion and the planar inner surface includes a serrated pattern.

14. The device of claim 13, wherein the void is defined at least in part by the serrated pattern of the inwardly-facing surface of the channel extending between the upper surface of the second portion and the planar inner surface.

15. The device of claim 13, wherein the flattened hinge arm defines an outwardly-facing surface that includes a complementary serrated pattern positioned in a different plane than the serrated pattern, such that protrusions of the serrated pattern overlap other protrusions of the complementary serrated pattern.

16. The device of claim 15, wherein the void is defined at least in part by the serrated pattern and the complementary serrated pattern.

17. The device of claim 16, wherein a shape of the state-transitionable material within the void mechanically blocks movement of the flattened hinge arm in the channel.

18. The device of claim 15, wherein the flattened hinge arm defines a receptacle that retains the state-transitionable material before assembly into the channel.

19. The device of claim 7, wherein the flattened hinge arm defines the height between first and second major surfaces and the first and second major surfaces have different perimeters.

20. The device of claim 7, further comprising a conductor that can be energized to heat the state-transitionable material.

* * * * *